(No Model.) 2 Sheets—Sheet 1.
J. R. LITTLE.
WHEEL.
No. 273,746. Patented Mar. 13, 1883.
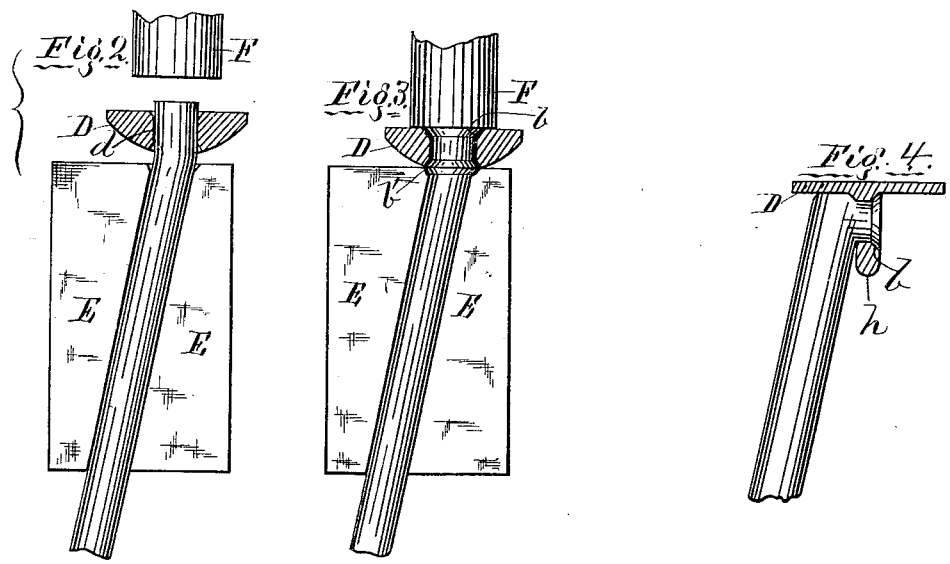
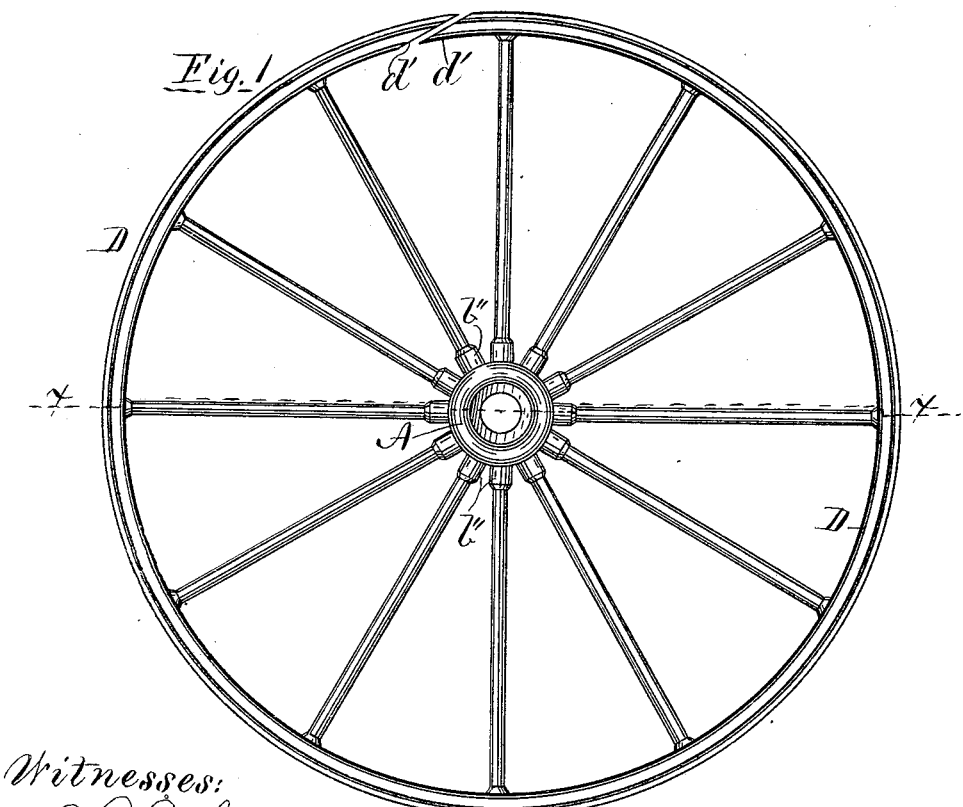
Witnesses:
P. R. Richards
H. Miller
Inventor:
Jas. R. Little
By W. B. Richards,
Atty.

(No Model.) 2 Sheets—Sheet 2.
J. R. LITTLE.
WHEEL.
No. 273,746. Patented Mar. 13, 1883.
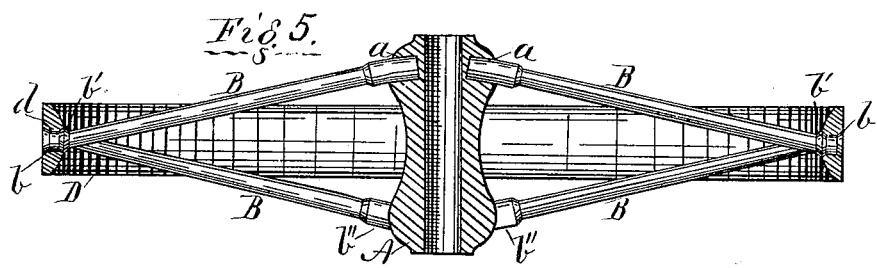
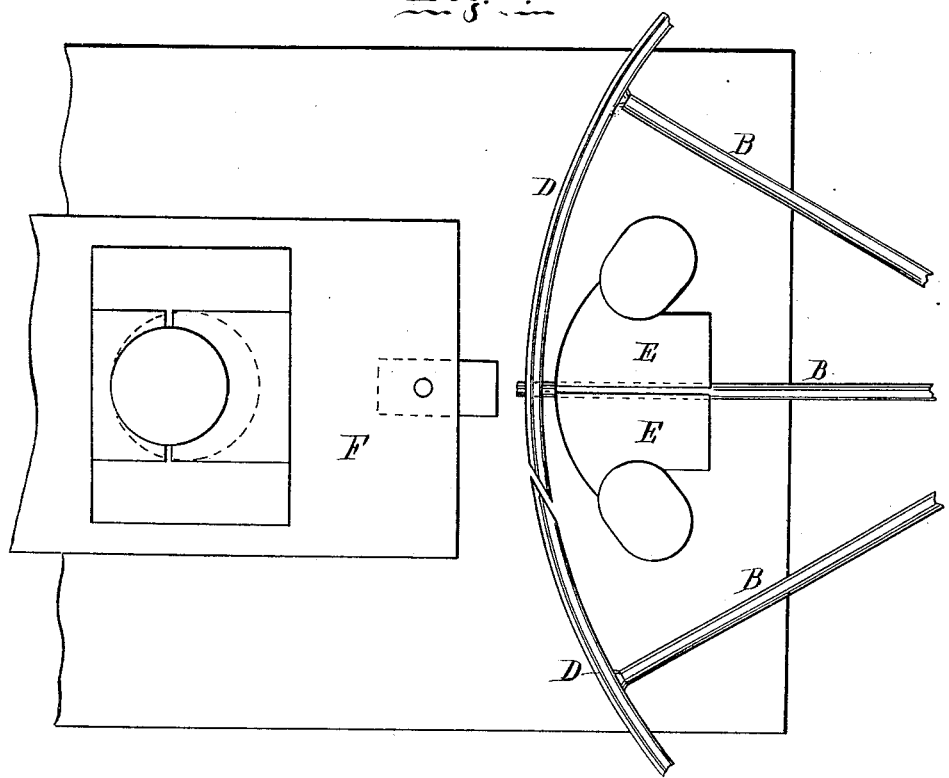

UNITED STATES PATENT OFFICE.

JAMES R. LITTLE, OF QUINCY, ILL., ASSIGNOR OF THREE-FOURTHS TO CYLON SMITH, THOMAS HILL, AND PLINY BLISS WILLIAMS, OF SAME PLACE.

WHEEL.

SPECIFICATION forming part of Letters Patent No. 273,746, dated March 13, 1883.

Application filed October 31, 1882. (No model.)

*To all whom it may concern:*

Be it known that I, JAMES R. LITTLE, a citizen of the United States, residing at Quincy, in the county of Adams and State of Illinois, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a side elevation of a wheel embodying my invention and completed ready to weld the rim. Figs. 2 and 3 are enlarged elevations and sections of details hereinafter referred to; Fig. 4, a modification. Fig. 5 is a sectional plan in the line $xx$ in Fig. 1. Fig. 6 is a side elevation of a portion of the wheel and a portion of the device for securing the rim to the spokes.

This invention has for its object to produce a strong and durable iron wheel at a minimum of cost; and the invention relates, mainly, to the manner in which the spokes are secured to the rim of the wheel.

The invention further consists in constructions and combinations hereinafter described and claimed.

Referring to the drawings by letters, the same letter indicating the same part in the different figures, A represents a metallic hub, which may be of any ordinary or desired construction.

B are spokes secured in the hub A by being driven into holes $a$ in the hub, or by inserting the spokes in said holes while the hub is hot and shrinking it on the spokes. The spokes B may be arranged as desired; but I prefer to set them in the ordinary manner, so that each spoke is bracing to the alternate spoke, as shown at Fig. 5.

D is the metallic rim of the wheel, which I prefer formed in its cross-section as shown at Figs. 2, 3, and 5, with holes $d$ for the reception of the outer ends of the spokes, which holes are enlarged at the outer and inner peripheries of the rim, as shown at same figures.

In constructing the wheel I first secure the spokes to the hub, as hereinbefore described, and then put the rim in place, with the spokes projecting through the holes $d$, of greater diameter than the spokes, as shown at Fig. 2. Each spoke in turn is then held by any suitable clamps, E, operated by cams $e$ or by other means, while a hand or power hammer, F, is used to form the enlargement or rivet $b$ on the outer end of the spoke, and at the same time the enlargement or collar $b'$ interior to the rim, as shown at Fig. 3. The enlargements $b$ and $b'$ will secure the spokes and rim firmly to each other, and in a manner such as to enable the rim to resist great force against both its outer and inner peripheries, and the neck between the collars will be enlarged to fit closely the walls of hole $d$, which enlargement makes said neck of greater diameter than the body of the spoke, which is thereby strengthened at a weak point. When the spokes are all secured to the rim, the ends $d'$ of the rim may be properly prepared, as shown at Fig. 1, and are then welded to each other to complete the wheel. If desired or preferred, a tire may be placed on the rim D; but the wheel is complete without a tire.

I make no claim in this application to the process, as I intend making it the subject-matter of a separate application.

The spokes may be formed of iron rods of uniform diameter throughout their lengths; but I prefer to have their ends $b''$, next the hub, enlarged, as shown in the drawings. The greatest strain on the spokes from vibration of the rim and spokes is next the hub and rim, and by enlarging the spokes at these points their capability is increased to resist this strain.

Fig. 4 shows a modification in which the rim has an annular flange, $h$, on its inner periphery, with lateral holes through said flange, which holes are enlarged at both ends, and the spokes bent at their outer ends and passed through said holes and riveted therein, as shown at said figure.

Other modifications than that shown in Fig. 4 will suggest themselves as equivalent methods of applying the main features of my invention to practical use, and hence I do not limit my claims to the specific manner of applying my invention shown; but

What I claim as new is—

1. In an iron wheel, in combination with an iron rim having holes enlarged in the inner and outer peripheries of the rim, spokes with enlargements of greater diameter than the spokes, fitted to said enlargements of the holes in the rim at both the inner and outer peripheries of said rim, substantially as and for the purpose specified.

2. An iron wheel formed of spokes fitted at their inner ends to the hub, and their outer ends seated in holes in the rim, and enlarged on both sides of the rim to fit correspondingly-enlarged holes in said rim, said enlargements greater in diameter than the spokes, substantially as and for the purpose specified.

3. An iron wheel formed of spokes, with enlarged inner ends secured to the hub, and enlarged outer ends next the rim of the wheel, substantially as and for the purpose specified.

4. In an iron wheel, in combination with a rim, spokes secured at their inner ends to the hub, and their outer ends passed through holes in parts of the rim, and secured therein by riveting or enlarging the spoke on both sides of the part of the rim through which it passes, substantially as and for the purpose specified.

5. In an iron wheel, the combination of an iron rim having spoke-holes of greater diameter than the body of the spokes, and spokes having the parts within the rim of greater diameter than their bodies and tightly fitting the holes in said rim, substantially as described.

In testimony whereof I affix my signature in presence of two witnesses.

JAMES R. LITTLE.

Witnesses:
P. B. WILLIAMS,
J. W. GARDNER.